July 9, 1929.   W. W. SPAINHOWER   1,720,612
COW YOKE
Filed Nov. 7, 1927
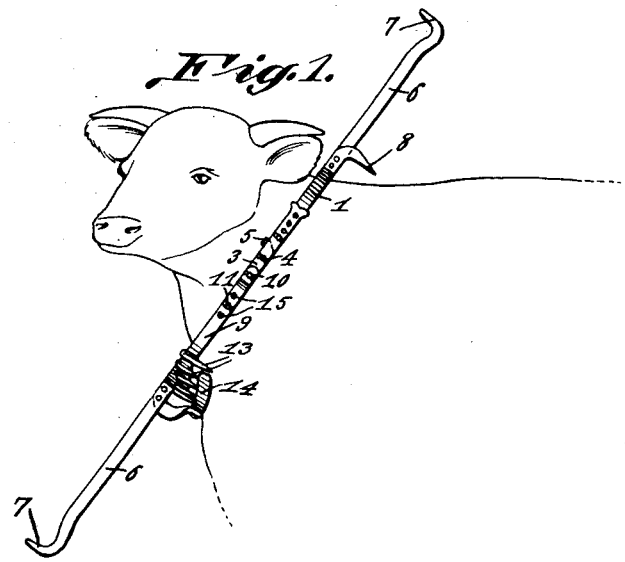
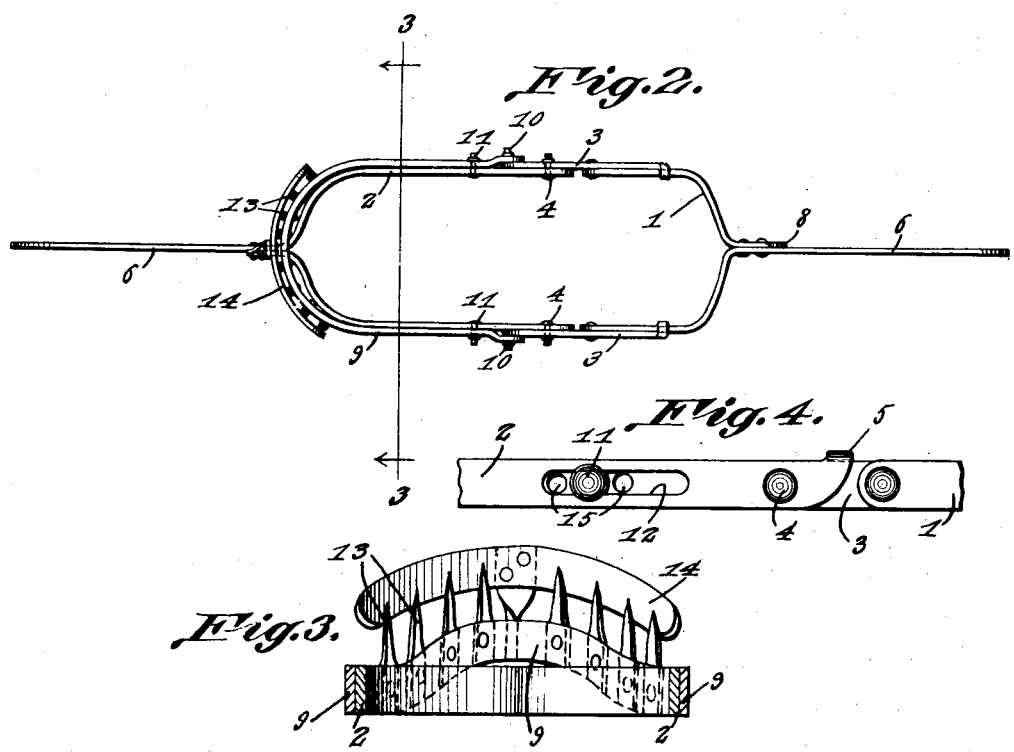
Walter W. Spainhower, INVENTOR
BY Victor J. Evans
ATTORNEY

Patented July 9, 1929.

1,720,612

UNITED STATES PATENT OFFICE.

WALTER W. SPAINHOWER, OF BLOOMFIELD, INDIANA.

COW YOKE.

Application filed November 7, 1927. Serial No. 231,671.

This invention relates to a cow yoke, the general object of the invention being to provide means for causing pointed projections to enter the neck of the animal if the animal should make an attempt to pass through a fence, thus causing the animal to back away from the fence.

Another object of the invention is to make the device adjustable.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use upon an animal.

Figure 2 is a front view of the device.

Figure 3 is a section on line 3—3 of Figure 2.

Figure 4 is a fragmentary edge view.

In these views, 1 indicates the upper yoke and 2 indicates the lower yoke. The upper yoke is formed with adjustable side pieces 3 and the lower yoke is pivoted to these side pieces, as shown at 4. By having the pieces 3, the limbs of the upper yoke can be adjusted as to their length. The ends of the arms of the lower yoke are formed with stops 5 which engage the side pieces 3 and limit the movement of the two yokes in a forward direction. Each yoke is provided with a long arm 6 at its center which is formed with a hook 7 at its outer end for engaging the wires of a fence if the animal should attempt to pass through the fence. The upper yoke is provided with a pointed projection 8 at its rear which will penetrate the neck of the animal when the arm of the upper yoke is pushed rearwardly by the animal attempting to pass through a fence. A U-shaped member 9 has its limbs pivoted to the ends of the side pieces 3, as shown at 10, and a slight distance beyond the pivotal points, pins 11 pass through the limbs of the U-shaped member and through slots 12 formed in the limbs of the lower yoke 2 so that as the yokes are moved rearwardly, the U-shaped member is pulled upwardly and inwardly by its pivotal connection with the upper yoke and by its pin and slot connection with the lower yoke so that the pointed projections 13 carried thereby will enter the breast of the animal and thus cause the animal to back away from the fence. A guard 14 is carried by the lower yoke and normally covers the projections 13 of the U-shaped member to prevent them from entering the breast of the animal. I prefer to provide a plurality of holes 15 in the U-shaped member, any one of which is adapted to receive each pin 11 so that the parts can be adjusted by placing the pins in their desired holes.

From the foregoing it will be seen that the device can be adjusted to suit the neck of the animal on which it is to be used and that when in place, the parts will normally be in a position with the yokes in alignment and the projections held away from the body of the animal. If the animal should attempt to pass through a fence, however, the fence wires, striking the arms 6 of the upper and lower yokes and their hooked extremities, would cause the yokes to pivot on each other and thus the projection 8 would enter the upper portion of the body of the animal, while the projections 13 would enter the breast or front part of the neck of the animal and the resultant pain would cause the animal to back away from the fence. As soon as the animal leaves the fence, the parts assume their normal position so that the points will not penetrate the animal.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A cow yoke comprising upper and lower yoke-shaped members, side pieces slidably connected with the limbs of the upper member, means for pivoting the limbs of the lower member to the side pieces, a U-shaped member fitting over the lower member with its bight offset from the bight of the lower member, teeth on the bight of the U-shaped member, means for pivoting the ends of the U-shaped member to the side pieces and means for detachably connecting the limbs of the U-shaped member to the limbs of the lower yoke-shaped member.

2. A cow yoke comprising upper and lower yoke-shaped members, side pieces slidably connected with the limbs of the upper member, means for pivoting the limbs of the lower member to the side pieces, a U-shaped member fitting over the lower member with its bight offset from the bight of the lower member, teeth on the bight of the U-shaped member, means for pivoting the ends of the U-shaped member to the side pieces, means for detachably connecting the limbs of the U-shaped member to the limbs of the lower yoke-shaped member, an upwardly extending member having a hook at its upper end connected with the top of the upper yoke member, a depending member having a hook at its lower end connected with the lower end of the lower yoke member and a hook on the top of the upper yoke member.

3. A cow yoke comprising upper and lower yoke-shaped members, side pieces slidably connected with the limbs of the upper member, means for pivoting the limbs of the lower member to the side pieces, a U-shaped member fitting over the lower member with its bight offset from the bight of the lower member, teeth on the bight of the U-shaped member, means for pivoting the ends of the U-shaped member to the side pieces, means for detachably connecting the limbs of the U-shaped member to the limbs of the lower yoke-shaped member and a shield attached to the lower yoke-shaped member and extending over the teeth on the U-shaped member.

In testimony whereof I affix my signature.

WALTER W. SPAINHOWER.